Figure 1:
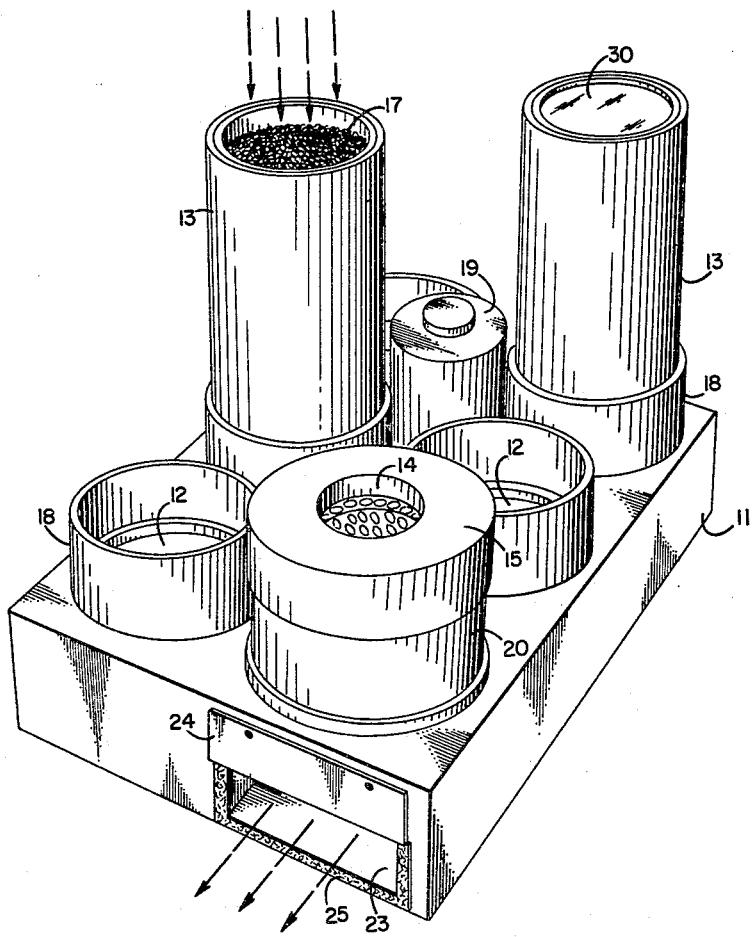

April 13, 1965  W. E. McCONNAUGHEY  3,178,269
CARBON DIOXIDE ABSORPTION MANIFOLD
Filed July 10, 1964  2 Sheets-Sheet 1

INVENTOR
WILLIAM E. McCONNAUGHEY
BY *Melvin L. Crane* AGENT
*R. Sciascia* ATTORNEY April 13, 1965   W. E. McCONNAUGHEY   3,178,269
CARBON DIOXIDE ABSORPTION MANIFOLD
Filed July 10, 1964   2 Sheets-Sheet 2

INVENTOR
WILLIAM E. McCONNAUGHEY
BY  *Melvin L. Crane* AGENT
    *R. Scascia* ATTORNEY 3,178,269
CARBON DIOXIDE ABSORPTION MANIFOLD
William E. McConnaughey, Bowie, Md., assignor to the United States of America as represented by the Secretary of the Navy
Filed July 10, 1964, Ser. No. 381,938
3 Claims. (Cl. 23—284)
(Granted under Title 35, U.S. Code (1952), sec. 266)

The invention described herein may be manufactured and used by or for the Government of the United States of America for governmental purposes without the payment of any royalties thereon or therefor.

This application is a continuation-in-part of application Serial Number 92,421, filed February 28, 1961, now abandoned, and relates generally to a device for removing carbon dioxide from the atmosphere and more particularly to removal of carbon dioxide without the attendant release or production of noxious chemicals.

The removal of carbon dioxide from compartments in large quantities has been accomplished in the past by the use of either soda lime or lithium hydroxide. Since lithium hydroxide has proved superior to soda lime in several respects it is now the major chemical used to remove carbon dioxide. There are, however, some aspects of the use of lithium hydroxide which are undesirable and it is to avoid these aspects that the present invention has been developed.

Lithium hydroxide is furnished for some uses, particularly the use concerned in the present application, in uniformly small crystals of excellent purity. The particle size and friability are essential to efficient carbon dioxide removal, however, these requirements lead to irritating dust being developed which produces coughing and sneezing and must be eliminated. The dust is produced in handling the small crystals as well as in storing the lithium hydroxide. Some of the dust produced has been prevented by pressing lithium hydroxide monohydrate into cakes which are crushed to size, screened, and dehydrated to furnish a satisfactory mass for the bulk removal of carbon dioxide. This material is generally used in a forced-ventilation device, but handling of the material and storage thereof still cause some dusting. The hoppers which have been developed and are currently used for bulk removal of $CO_2$ are loaded by pouring bulk lithium hydroxide from a large container into the hopper. The hopper is connected to a blower, air is drawn through the chemical and $CO_2$ is removed and the spent material returned to its container, however, not without the formation of noxious dust.

The present invention avoids the formation of such undesirable dust, is a more compact and easily transported device for removal of $CO_2$, and has greater removal capacity than the hopper type. This device may contain absorbents which will remove gases other than $CO_2$.

Accordingly, it is an object of the present invention to provide a means for removing carbon dioxide from the atmosphere of a compartment without the production of noxious chemicals.

It is another object of the present invention to provide a means for carbon dioxide removal which includes a plurality of absorption components.

It is a further object of the present invention to provide a carbon dioxide removal unit which is compact and easily portable from one space or compartment to another.

It is a further object of this invention to provide a carbon dioxide manifold which contains a filtering means for selective use during an operation.

It is a further object of the present invention to provide a manifold for induced flow of compartment air thereto and to a plurality of canisters containing the $CO_2$ absorbent chemical.

It is a further object of the present invention to provide a device for removal of carbon dioxide which is virtually silent in operation.

Figure 2:
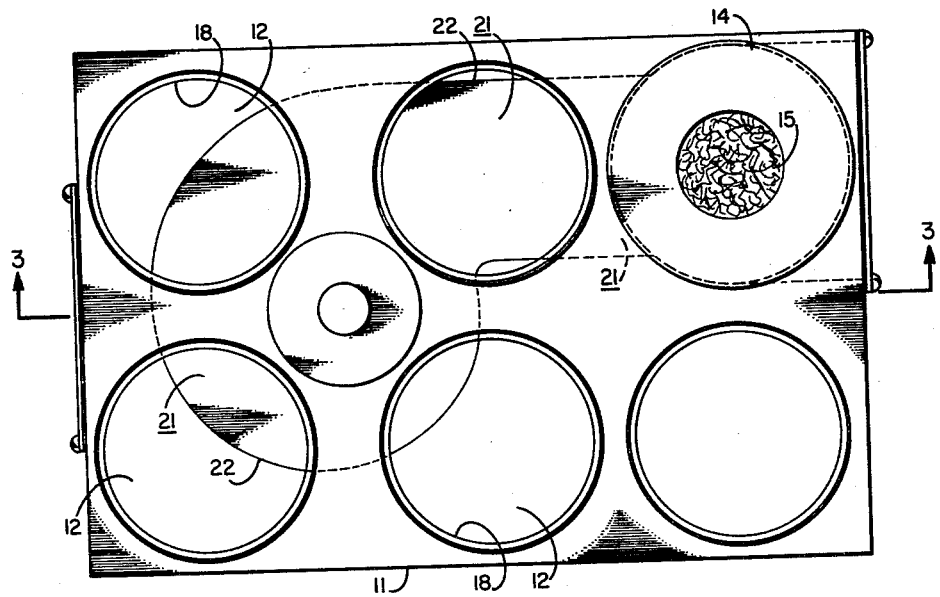

Various other objects and advantages will appear from the following description of an embodiment of the invention, and the novel features will be particularly pointed out hereinafter in connection with the appended claims, wherein:

FIG. 1 is a perspective view of the device;
FIG. 2 is a top view; and
FIG. 3 is a cross sectional view illustrating the motor, inlet to the blower, and other relative parts.

Figure 3:
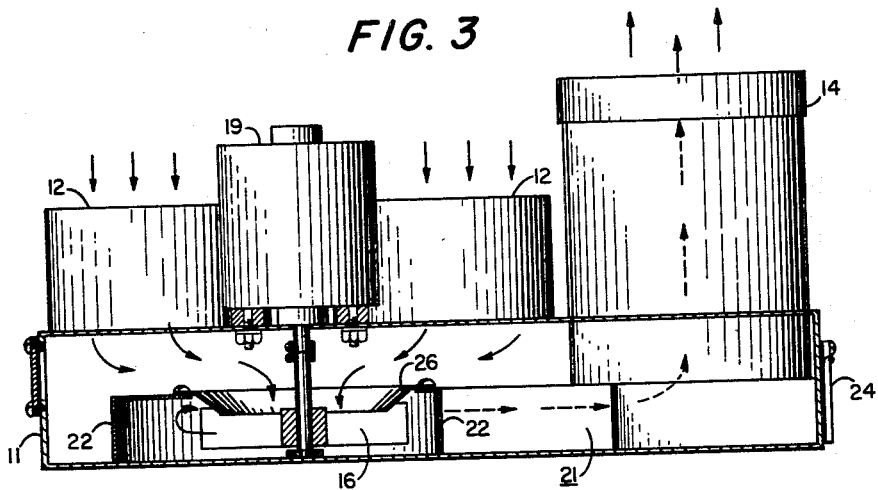

In the embodiment of the invention as illustrated by FIGS. 1, 2, and 3, there is shown suitable structure for removing carbon dioxide from air that passes through the inlet filters of the device. The device includes a housing 11 having inlet openings 12 and an outlet opening 14 each of which pass through the upper wall of the housing. Openings 12 are provided with canister support rings 18 around their periphery which receive therein canisters 13. Canisters 13 have inserted therein a compacted carbon dioxide removal chemical 17 such as lithium hydroxide through which air is drawn by draft created by a blower 16 which is driven by a shaft connected with motor 19.

The blower 16 is of a type such as a Tarrington 610-104 Airotor which draws air into the fan along the drive shaft and forces the air out along the fan blades into an outlet channel 21. The air is drawn in through the inlet openings 12 in the housing and drawn through the blower which is positioned at the entrance to the outlet channel 21 within the housing as shown in FIG. 2. The channel is formed by the bottom of the housing and a top portion separated by sides 22 that extend upwardly from the bottom of the housing toward the top of the housing, a distance half-way between the bottom and top thereof. A blower housing inlet 26 to the blower is formed by a convex surface that is secured to the top wall of the outlet channel and extends downwardly toward the blower rotor with decreasing diameter with an outer section of the blower rotor extending upwardly around the periphery of the blower inlet housing. The housing 11 is open to the inlets 12 to receive incoming air between the top and bottom walls of the housing except in the area of the outlet channel 21 which extends upwardly from the bottom midway to the top of the housing. Therefore, the portions of those inlets 12 that are above the outlet channel have an airspace in the housing of only half the height of the other inlets. However, since the inlet to the blower is half the distance between the bottom of the housing and the top thereof the air is drawn up and over the inlet to the blower which forms effectively the same inlet space for all inlets into the housing with equal suction by the blower.

Outlet opening 14 connects with the outlet channel 21 from the blower at right angles thereto and an outlet 23 in the end wall of the housing joins the blower outlet channel as a straight through outlet. The outlet opening 14 is provided with a support ring 20 within which a filter is placed to filter outlet air, if desired. Outlet 23 is provided with a sliding panel with associated tracks or a door 24 which closes off outlet 23 in order to force air out through outlet opening 14. The blower housing inlet 26 connects the inlet openings 12 to the blower inlet and the blower outlet channel 21 directs the air out through the blower outlet channel through either the outlet opening 23 in the end of the housing or the outlet opening 14 through the top of the housing if the opening 23 is closed off. Outlet air passes through outlet 14 only when outlet 23 in the end is closed off by closing the panel or door.

The output side of the blower may be alternately connected to exit carbon-dioxide-free air to opening 23 or through the filter 15 secured above outlet 14. To accomplish the routing of air, panel 24 is easily moved by sliding downward to block passage of air out of opening 23. Exit 23 is framed by sealing material 25 to limit the leakage of air past panel 24. The filtered material in filter 15 may be either convoluted paper or a fiberous mass which will permit a desired rate of flow of air and will remove particles of the size which it is necessary to have removed from the air. The canisters 13 may be provided with sealed lids 30 of any suitable type to seal the chemical inside the canisters from ambient air. The lids are removed when it is desired to draw air through each or any number or all of the filters of the device. The canisters and the filter within the manifold are removable so that a filter may be easily replaced once it has been used to the extent desired.

The device has been shown with five inlets and one outlet opening in the top thereof; however, the number of inlet openings may be decreased or increased and the number of outlet openings may be increased without departing from the invention. The number of inlets and outlets depend on the rate of carbon dioxide removal desired.

Although the operation of the device is relatively uncomplicated and has been explained in part in the foregoing description, it will now be explained in more detail. Operation would first involve placing the desired number of canisters onto the manifold and then placing within the canisters the carbon dioxide removal substance such as lithium hydroxide. The loading may be accomplished before the time for use has arrived since, as noted above, covers or lids may be placed over the canisters to seal the chemicals from their surrounding atmosphere until it is desired to draw air through them. The number of canisters to be used is determined by the volume of carbon dioxide desired to be removed per unit of time. The diameters of the openings are not specified as it is apparent that they may be made quite large without reducing the effectiveness of the invention. The device may be run with all canisters inserted and with covers over those canisters which are not needed at that particular time. After one chemical filter insert has been used the canister containing that chemical may be removed and by opening the lid of another or more than one other canister additional absorbent is exposed to the passage of air while the spent absorbent is removed and replaced.

It has been observed that despite precautions taken in packing chemicals rather than using granular chemicals in the canisters, some dust developed is normally exited into the atmosphere upon initial operation of the device. This initial dust is removed by closing panel 24 before initial operation and directing the exiting of carbon-dioxide-air through outlet opening 14 and filter 15. This operation is necessary for only a very short time, a matter of minutes, after which there are no longer dust particles remaining among the particles which are sufficient to cause discomfort to personnel. It has been noted that the device when in operation after the removal of the initial dust will itself remove dust in the inlet air which was present in the air before operation commenced. This, however, is an incidental advantage of the device and whether an appreciable amount of such dust is removed during operation of the machine has not been determined or investigated.

The present device has been effective in reducing the generation of noxious dust caused by bulk chemical handling in the use of prior carbon dioxide removal devices. This elimination has been virtually entirely complete and any minute particles which might escape are negligible in their effect on personnel.

The present invention has a particular applicability in providing a method of removing carbon dioxide from the atmosphere in a submerged submarine without subjecting the personnel aboard to noxious chemicals and also without subjecting them or requiring that they perform a tedious and complicated loading, replacing, cleaning, etc., of the carbon dioxide removal agent. A further advantage of the present device is that the chemical is retained in a container which is removed when the chemical has been used, and this is a distinct advance over previous devices wherein the used chemical swelled slightly during use so that it was difficult to return it to its original container.

It will of course be appreciated that the arrangement of components on the device such as support rings for the canisters or the opening for the filter may be altered, that they may be spaced in different relation to the blower on one surface of the device or distributed on other surfaces as well as on the surface shown here within the concept as mentioned. Also it is emphasized that the device may be used to remove not only carbon dioxide but other gases simultaneously by the insertion of canisters containing chemicals which will remove the other gases. It is believed that the concept of portability in the carbon dioxide remover of the present invention, combined with the facility for removing used chemicals readily and without the creation of dust, as well as with a self-contained means for absorbing or removing dust which despite the compactness of the chemicals is present, are advantages of the present invention over prior gas removers. The compactness and lightness of weight as well as portability are exceedingly important factors, and the ability to use several different chemicals to remove several different gases simultaneously is a distinct advance over such prior devices.

It will be understood that various changes in the details and arrangements of component elements and chemicals, and in the selection of caps or canisters through which the gases are drawn which have been described and illustrated here in order to explain the nature of the invention, may be made by those skilled in the art but in the principle and scope of the invention as expressed in the appended claims.

Obviously many modifications and variations of the present invention are possible in the light of the above teachings. It is therefore to be understood that within the scope of the appended claims the invention may be practiced otherwise than as specifically described.

What is claimed is:

1. A carbon dioxide absorption apparatus comprising:
   a housing,
   a plurality of inlet openings and at least two outlet openings in said housing,
   canister receiving means connected with said housing and surrounding each of said inlet openings,
   a plurality of canisters adapted to fit into said plurality of inlet openings,
   absorbent means for absorbing carbon dioxide,
   said absorbent means inserted into said canister in selected quantity to remove a selected amount of carbon dioxide from the gases drawn therethrough,
   means within said housing separating said inlet openings from said outlet openings for inducing a flow of gas between said inlet openings and said outlet openings,
   filter means inserted in one of said outlet openings for filtering particles and noxious gases from the gases passing therethrough,
   and closure means removably installed over the outlet not having filter means inserted therein for closing said outlet when exit gases are to be filtered and opening said outlet when said outlet containing said filter is to be bypassed.

2. A selective gas absorption apparatus for absorbing a plurality of selected gases from an atmosphere comprising:
- a housing,
- a plurality of inlet openings and at least two outlet openings in said housing,
- a canister receiving means connected with said housing and surrounding each of said inlet openings,
- a plurality of canisters adapted to fit into said plurality of inlet openings and having removable covers permitting blocking of selected inlet openings,
- selected absorbent means for absorbing selected gases,
- each absorbent means inserted into a selected canister to remove a selected gas from the gases drawn therethrough,
- means within said housing separating said inlet openings from said outlet openings for inducing a flow of gas between said inlet openings and said outlet opening,
- filter means inserted in one of said outlet openings for filtering particles and noxious gases from the gases passing therethrough,
- and closure means removably installed over the outlet not having filter means inserted therein for closing said outlet when exit gases are to be filtered and opening said outlet when said outlet containing said filter is to be bypassed.

3. A selective gas absorption apparatus for absorbing a plurality of selected gases from an atmosphere comprising:
- a housing,
- a plurality of inlet openings and at least two outlet openings in said housing,
- canister receiving means partially enclosing each of said inlet openings,
- a plurality of canisters adapted to fit into said plurality of inlet openings and having removable covers permitting blocking of selected inlet openings,
- selected absorbent means for absorbing selected gases,
- each absorbent means inserted into a selected canister in selected quantity to remove a selected amount of a selected gas from the gases drawn therethrough,
- means within said housing separating said inlet openings from said outlet openings for inducing a flow of gas therethrough,
- filter means inserted in one of said outlet openings for filtering particles and noxious gases from the gases passing therethrough,
- and closure means removably installed over the outlets not having filter means inserted therein for closing said outlets when exit gases are to be filtered and opening said outlets when said outlet containing said filter is to be bypassed.

References Cited by the Examiner

UNITED STATES PATENTS

| | | | |
|---|---|---|---|
| 2,675,885 | 4/54 | Fox | 23—284 X |
| 2,699,287 | 1/55 | Daninhirsch | 55—393 X |

FOREIGN PATENTS

| | | |
|---|---|---|
| 312,636 | 5/19 | Germany. |

References Cited by the Applicant

UNITED STATES PATENTS

| | | |
|---|---|---|
| 2,101,555 | 12/37 | Moore et al. |
| 2,952,526 | 9/60 | Carlson et al. |

MORRIS O. WOLK, *Primary Examiner.*

JAMES H. TAYMAN, Jr., *Examiner.*